Sept. 30, 1958  A. R. MARCY, JR., ET AL  2,854,104
FABRICATED GRILLE STRUCTURE
Filed May 24, 1955  2 Sheets-Sheet 1
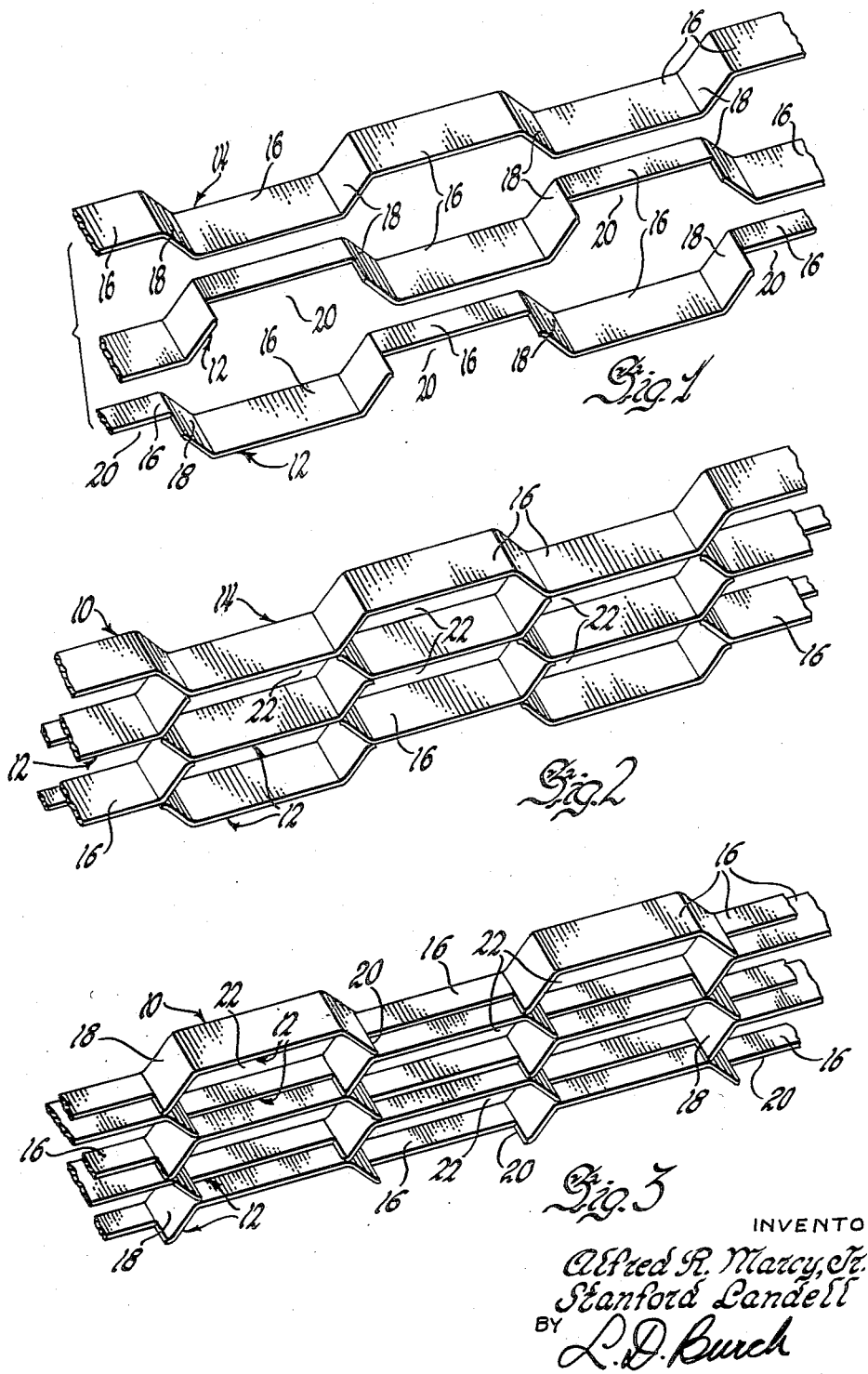
INVENTORS
Alfred R. Marcy, Jr. &
Stanford Landell
BY L. D. Burch
ATTORNEY Sept. 30, 1958　　A. R. MARCY, JR., ET AL　　2,854,104
FABRICATED GRILLE STRUCTURE Filed May 24, 1955　　　　　　　　　　　　　　2 Sheets-Sheet 2

INVENTORS
Alfred R. Marcy, Jr. &
Stanford Landell
BY
L. D. Burch
ATTORNEY

United States Patent Office 2,854,104
Patented Sept. 30, 1958

2,854,104

FABRICATED GRILLE STRUCTURE

Alfred R. Marcy, Jr., Syracuse, and Stanford Landell, Fayetteville, N. Y., assignors to General Motors Corporation, Detroit, Mich., a corporation of Delaware Application May 24, 1955, Serial No. 510,624

8 Claims. (Cl. 189—82)

This invention relates generally to fabricated grating or grille structures, and more particularly to a continuous open grille construction fabricated in a manner to simulate a cast or other unitary structure.

The proposed structure is especially adapted for decorative uses such as radiator grilles for automobiles, for example, wherein it is desirable for the grille to have the appearance of a substantial cast structure. However, the proposed grille is not limited to such uses, and it may be advantageously employed in the place of any presently used grating or grille work.

Fabricated gratings are usually made by assembling alternating corrugated and straight strips of material having the same width over the entire lengths thereof and welding, riveting or otherwise securing the strips together. The result is an open grating or grille structure of any desired length and width and as thick as the individual strips are wide and having at least two and usually three thicknesses of strip material at the places where the strips are joined.

The above method of fabricating gratings is wasteful of material, since the multiple thicknesses of material add nothing to the strength or utility thereof in the usual application of such gratings. The straight strips between the corrugated strips are also wasteful of material for the same reasons. Furthermore, while such structures are otherwise satisfactory for structural applications and the like, they are not particularly suited for applications where pleasing appearance is an important factor.

Accordingly, it is proposed to fabricate such grating or grille structures without the use of the straight intermediate strips so that all triple thicknesses of strip material are eliminated. In one form of the invention, portions of the corrugated strips are cut away along one edge thereof so that when the completed grille assembly is viewed in certain directions from one side thereof, the double thicknesses are not visible. In another form of the invention, portions of the strip are cut away in a manner so that they may be interlocked in assembling the strips in a manner to eliminate even the double layers of material. In all forms of the invention, the result is a simple, inexpensive structure that gives the appearance of a cast structure.

In the drawings:

Figure 1 is a fragmentary exploded perspective view of the elements making up one embodiment of the invention.

Figure 2 is a fragmentary perspective view of the elements shown by Figure 1 in assembled condition, and viewed in the same direction as in Figure 1.

Figure 3 is an upside down fragmentary perspective view of the assembly shown by Figure 2.

Figure 4:
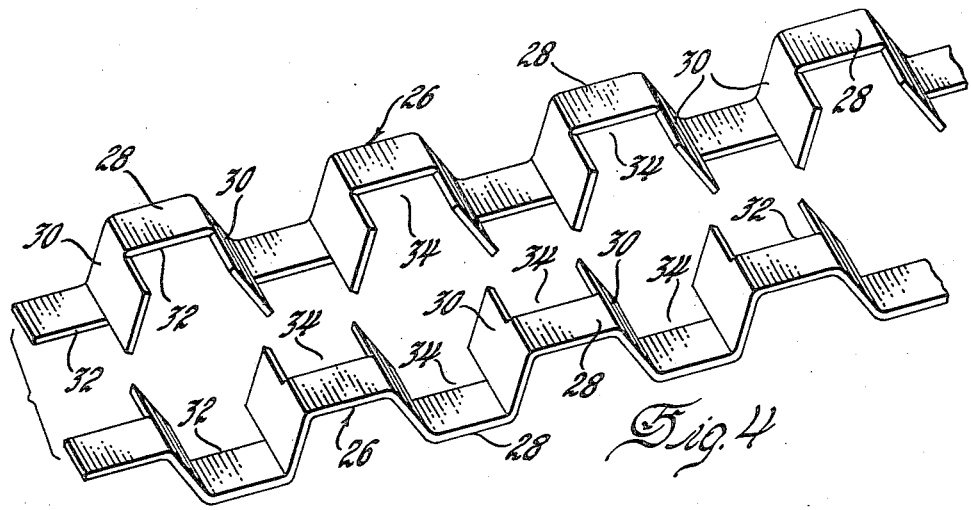
Figure 4 is a fragmentary exploded perspective view of the elements making up a modification of the invention.

Referring to the drawings in greater detail, the grille assembly 10 shown by Figures 2 and 3 comprises a series of strips of material suitably formed and secured together.

The strips may be of two kinds, inner strips 12 and border strips 14. The inner strips 12 comprise the major portion or body of the grille 10, and a border strip 14 may or may not be employed, depending upon the particular application of the grille 10.

The inner strips 12 and the border strips 14 are similarly corrugated to provide alternating spaced flat portions 16 and connecting portions 18. The alternate flat portions 16 of each of the inner strips 12 that lie in the same plane are cut away approximately to the longitudinal centerline and along only one side thereof, as shown at 20. It will be apparent that the depth to which the flat portions are cut away will depend upon the result desired, and the longitudinal centerline is not in any way controlling. Although the border strips 14 are similarly corrugated, they are not cut away so that all the flat portions 16 thereof are intact.

In assembling the inner strips 12 so that they may be joined to form the grating structure 10 shown by Figures 2 and 3, the strips 12 are shifted lengthwise with respect to each other the distance of one corrugation so that the uncut flat portions of one strip 12 engage the cut flat portions of the adjacent strip 12, as shown by Figure 1. The strips 12 may then be welded or otherwise secured together along these flat portions.

The result is an open cellular grille structure 10 such as that shown by Figures 2 and 3 in which a double layer of the strip material exists across only a portion of the width of the flat portions, as clearly shown by Figure 3. When the grille 10 is viewed from the other side thereof as shown by Figure 2 and from a point slightly above the plane of the flat portions, the double layer cannot be seen and the grille 10 has the appearance of a cast or other unitary structure. An uncut border strip 14 may be secured at the edge of the grille 10 having the cut outer flat portions, if so desired, to provide continuous uncut flat portions along that edge, as shown by Figures 1 and 2.

It should be apparent that the strips 12 and 14 may be corrugated in any manner with respect to the relative size and direction of the flat portions and the connecting portions so that the design of the openings 22 of the grating may be varied.

Figure 5:
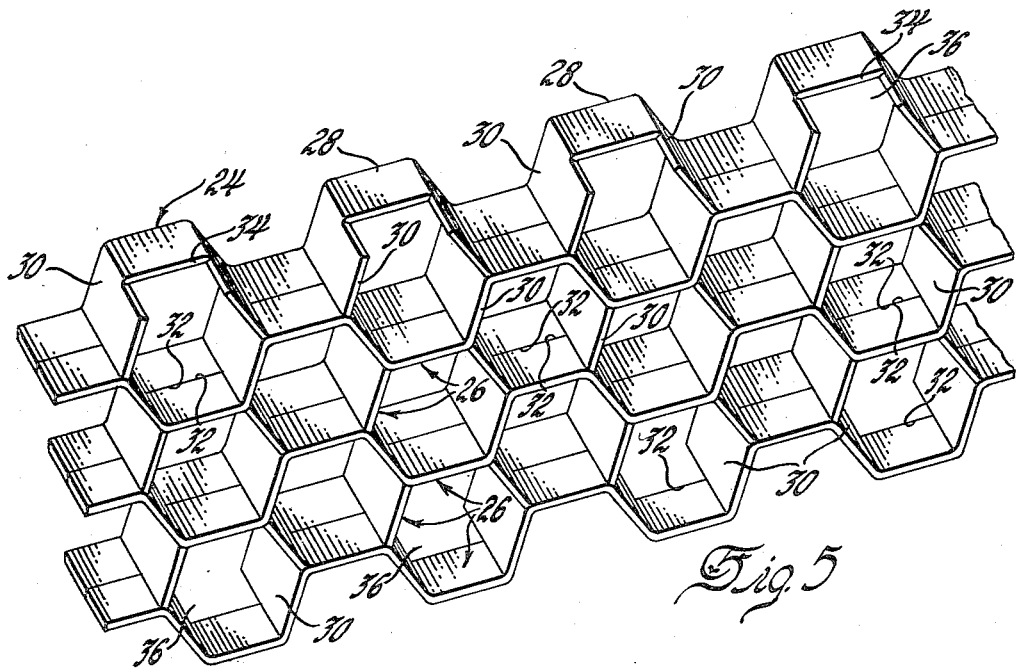
Figure 5 is a fragmentary perspective view of the elements shown by Figure 4 in assembled condition, and viewed in the same direction as in Figure 4.
Figure 6:
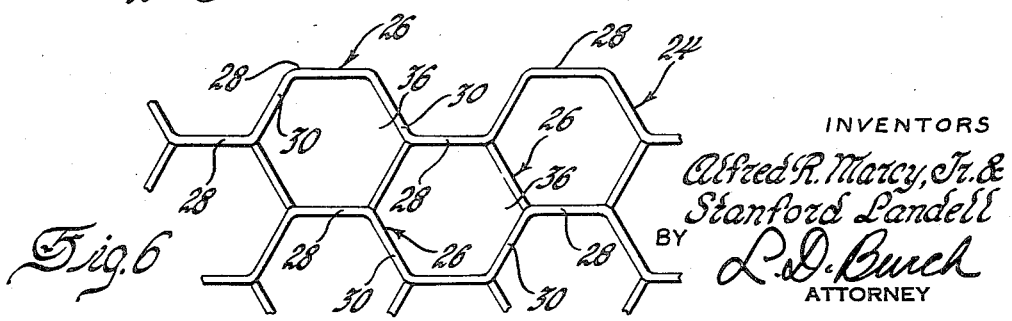
Figure 6 is a fragmentary side view of the assembly shown by Figure 5.

Figures 4, 5 and 6 illustrate a modified grille or grating structure 24 which is also formed by joining similarly corrugated strips 26 having alternating flat and connecting portions 28 and 30.

As best shown by Figure 4, the strips 26 for the modified grille structure 24 are cut out along all of the flat portions at the same side thereof and preferably to the centerline 32 thereof. The connecting portions remain uncut, as in the structure shown by Figures 1-3.

In assembling the strips 26 for the modified structure 24, however, alternate strips are reversed so that the cut out portions 34 of one strip are oppositely disposed from the cut out portions of either adjacent strip. In this manner, centerline edges 32 of the remaining portions of the flat portions 28 of the adjacent strips may be placed in abutting relation in the same plane as shown by Figure 5. The strips 26 are thus interlocked so that when the grille 24 is viewed from the side and along the edges of the strips, as shown by Figure 6, no double layers of strip material appear.

Such an assembly of strips may then be secured together by means such as welding or dip-brazing so that a structure simulating a completely cast or other unitary structure is produced. An uncut border strip similar to strip 14 may be employed if necessary.

The main difference between the structure shown by Figures 1-3 and the structure shown by Figures 4-6 is that the latter structure is completely devoid of double layers of material, no matter in which direction it is viewed.

Figures 4-6 clearly illustrate the manner in which the shape of the strips in any particular grille assembly may be varied to vary the design of the grating structure. In the grille 24 shown by Figures 4-6, the openings 36 are hexagonal, as contrasted from the elongated openings 22 of the assembly shown by Figures 1-3. As a further modification, it is entirely possible that alternating corrugated and straight strips may be employed, with the straight strips having portions thereof cut away according to the invention so that single thicknesses of material are presented.

While only two forms of the invention are shown and described, other structures may be fabricated which properly come within the scope of the invention as defined and limited only by the appended claims.

What is claimed is:

1. A fabricated grille structure, comprising a first corrugated member and a second corrugated member, each of said members having spaced portions thereof cooperating with spaced portions of the other member, the full front edge of alternate portions of each of said members being cut away.

2. A fabricated grille, comprising first and second corrugated members of uniform thickness and width, each of said members being formed to provide spaced portions engaging spaced portions of the other member to form a honeycomb structure, alternate portions of each of said members being cut away to reduce the width thereof.

3. A fabricated grille, comprising adjacent corrugated members directly engaging one another, at least one of said members having the full edge of the portions thereof engaging another of said members of reduced width.

4. A grille, comprising adjacent strips of material, each of said strips having edge portions thereof cut away, said cut away edge portions of one strip cooperating with uncut edge portions of the adjacent strip to provide a structure having only single strip thicknesses at one side thereof.

5. An open grating structure, comprising lengths of material formed to provide alternating flat portions and connecting portions for said flat portions, at least some of said flat portions being cut away along one side thereof, said lengths of material being arranged so that said cut away portions of one length of material engage cut away flat portions of the adjacent strip.

6. A fabricated grille structure comprising a plurality of corrugated members adjacently disposed and having portions thereof engaging similar portions of the next adjacent corrugated members, at least one of said members having alternate portions thereof relieved along the front edge, said corrugated members as secured together presenting in appearance a honeycomb structure of single walled uniform thickness.

7. A fabricated grille structure comprising a plurality of parallel and equally spaced members having alternately raised and depressed portions, the raised and depressed portions of each of said members respectively engaging the depressed portions of the next succeeding of said members and the raised portions of the preceding thereof for forming a honeycomb grille work, and one of said portions at each point of engagement between said members having the full front edge thereof cut away for avoiding double thickness appearance at one side of said grille work.

8. The fabricated grille structure of claim 7 disposed for use other than at normal eye level, and having said one engaged portion being that portion obscured from view by the portion engaged therewith and the disposition of said grille work relative to normal eye level.

References Cited in the file of this patent

UNITED STATES PATENTS

| | | |
|---|---|---|
| 1,264,758 | Berson | Apr. 30, 1918 |
| 1,727,214 | Niccum | Sept. 3, 1929 |
| 1,733,902 | Price | Oct. 29, 1929 |
| 1,733,903 | Price | Oct. 29, 1929 |
| 2,323,271 | Barry | June 29, 1943 |
| 2,607,455 | Yellin | Aug. 19, 1952 |